June 27, 1939.    H. K. MOORE    2,164,142
METHOD OF AND MEANS FOR FILTERING FINELY
DIVIDED SOLIDS FROM FLUID SUSPENSION
Filed June 23, 1936    2 Sheets-Sheet 2
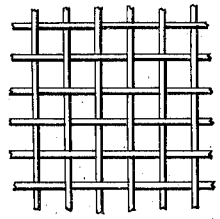
Fig. 4.
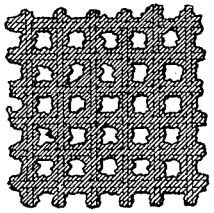
Fig. 5.
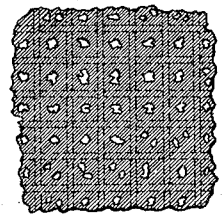
Fig. 6.
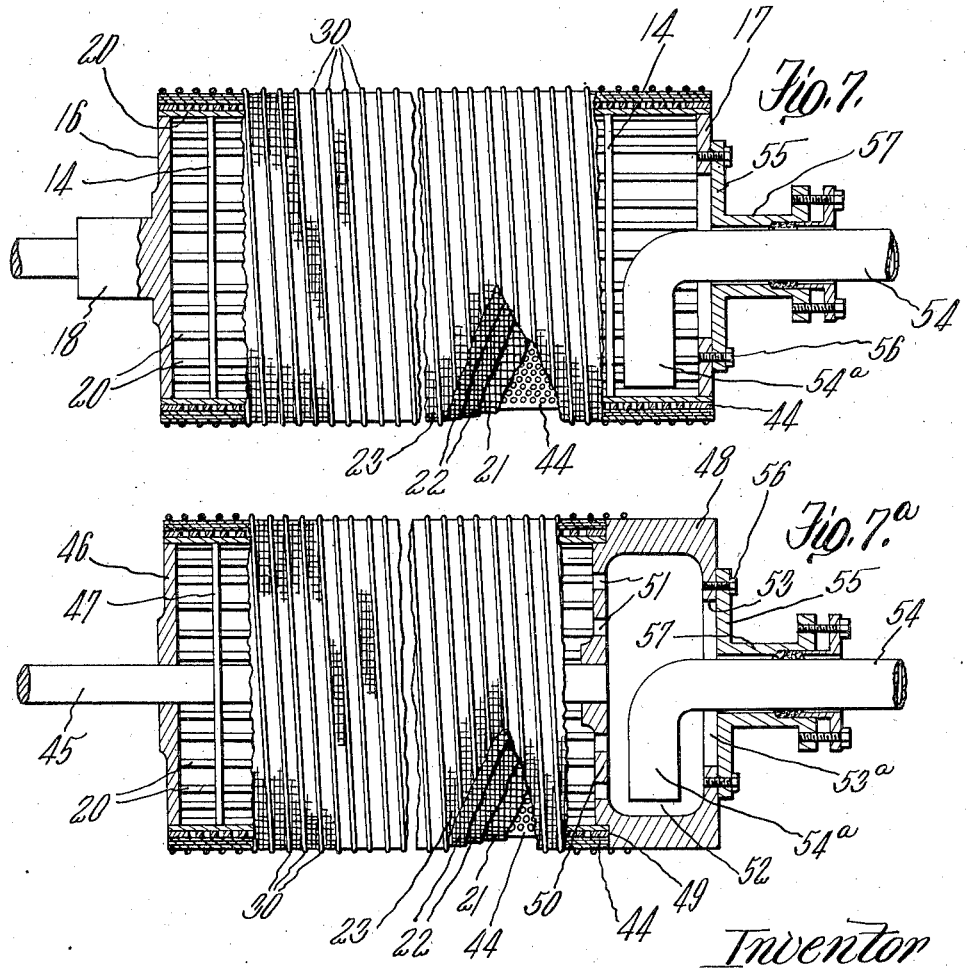
Fig. 7.
Fig. 7a.
Inventor
Hugh K. Moore

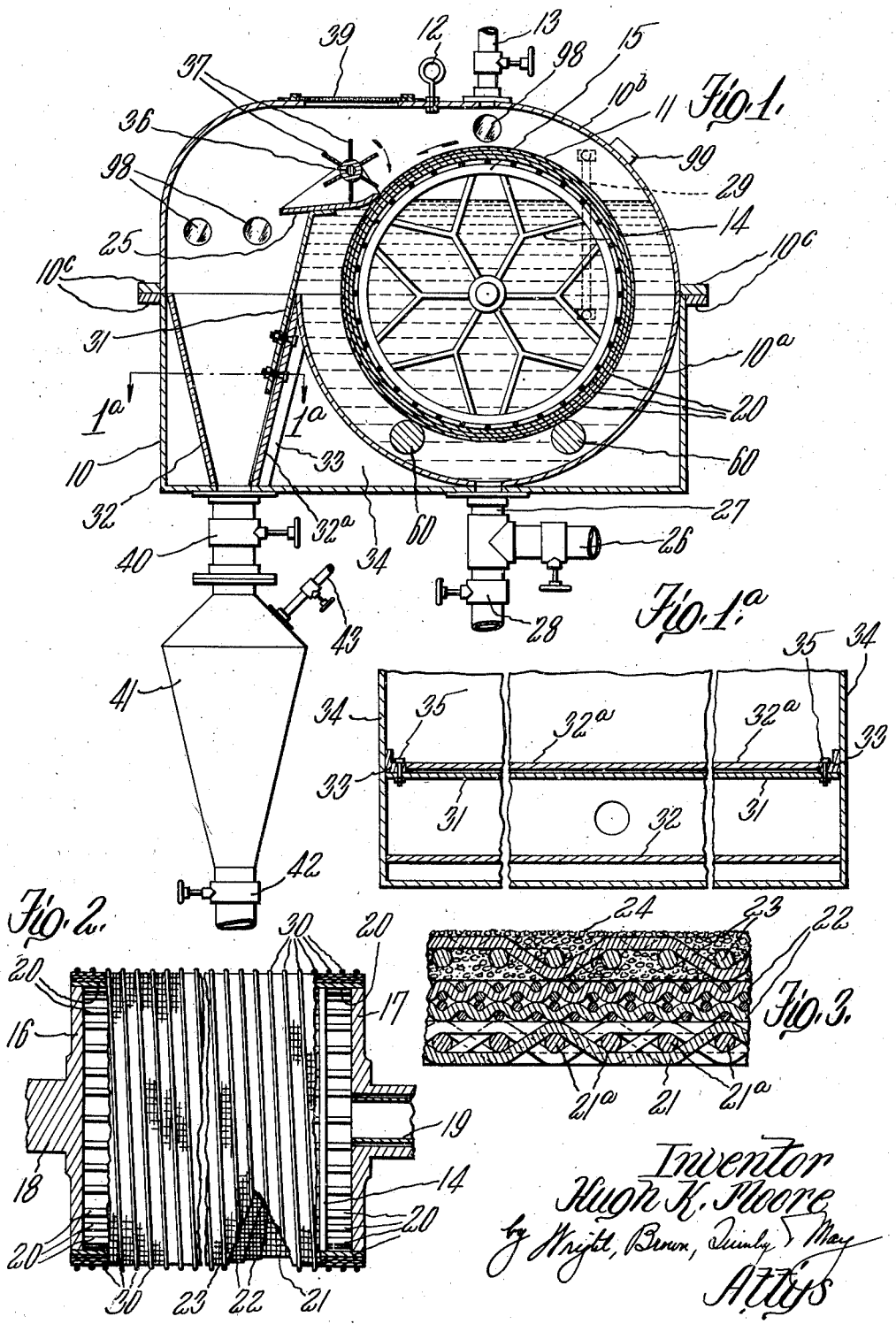

UNITED STATES PATENT OFFICE 2,164,142

METHOD OF AND MEANS FOR FILTERING FINELY DIVIDED SOLIDS FROM FLUID SUSPENSION

Hugh Kelsea Moore, York Harbor, Maine, assignor to Brown Company, Berlin, N. H., a corporation of Maine Application June 23, 1936, Serial No. 86,768

12 Claims. (Cl. 210—199)

This invention broadly relates to a method of and means for filtering finely divided solids from fluid suspensions. It deals more particularly with the filtration of solids suspended in such finely divided state and/or suspended in fluid media of such character that separation of the solids from the fluid cannot be economically effected by conventional filtering practices. While not restricted thereto, it has special utility in filtering finely divided precipitates from chemically corrosive aqueous liquors, for instance, in filtering precipitated potassium chloride from a strong solution of caustic potash, precipitated barium sulphate from a strong solution of barium sulphide, precipitated barium sulphate from a strong solution of barium hydroxide, precipitated barium sulphate, strontium sulphate, or calcium sulphate from strong solutions of caustic soda, etc.

It is well at the outset to consider the difficulties that beset one desirous of filtering precipitates suspended in liquors falling into the foregoing categories. To begin with, the use of filter cloths as the filtering media for strongly alkaline or strongly acid liquors presents the drawback of inordinate expense, as filter cloths are rapidly destroyed by such liquors and require frequent replacement, which entails labor costs and lost capacity on account of shutdowns. Attempt has been made to prolong the useful life of filter cloths by coating or protecting their yarns with rubber, but this is only a makeshift cure, as the rubber-coated yarns are still subject to attack by the liquors. Although the rubber coating on the yarns does prolong the useful life of the cloths, it is questionable whether the improvement effected in this direction is worth the cost added to the cloths on account of such coating. It is, of course, possible to reduce chemical attack on filter cloths by diluting the liquors to be filtered and/or by lowering the temperature at which filtration is being conducted. However, the money thus saved on filter cloths is at least partly lost by reason of the additional expense incurred in concentrating the filtrate for the recovery of such valuable chemical as may be present therein.

It might offhand be thought that wire cloth could be used in place of fibrous cloths for filtering chemically corrosive liquors, but wire cloths can be used effectively in filtering out only comparatively coarse precipitates, since it has thus far been commercially impossible to fabricate wire cloths of such fine mesh that they are capable of retaining finely divided precipitates of the sort hereinbefore mentioned. In this connection, it might further be observed that wire cloths of extremely fine mesh, such as are commercially producible, present mechanical difficulties, being so tenuous and defective in strength as to be easily distortable and broken through when used as a filtering media under commercial conditions. Thus, the use of extremely finely woven wire cloth in a filter-press requires fussy supervision of such a factor as the thickness of filter cake deposited thereon, since a heavy or thick filter cake would tend to distort or even rupture such cloth. The use of extremely finely woven wire cloth in a rotary or continuous filter is accompanied by a tendency for such cloth to flex repeatedly under the intermittent pressure and suction to which it may be subjected, in consequence of which it tends to fail at its regions of flexing. Again, once the extremely finely woven wire cloth becomes plugged with precipitate of an insoluble character, it must be discarded; and this makes for considerable expense, as wire cloth filtering media are even far more expensive than fibrous cloth media. And, as already indicated, there is no wire cloth filtering medium available on the market so finely woven that it is capable of retaining therein finely divided precipitates of the sort to which reference has already been made.

I have found that the usual woven wire cloths of commerce now serving as the filtering media for only comparatively coarse solids may be treated so that they become effective in retaining much more finely divided solids. To this end, I have found that the usual woven wire cloths, such as those made from nickel, copper, nickel-copper alloys, nickel-chromium alloys, nickel-chromium-iron alloys, and the like, may be sprayed with molten metals of various kinds and the meshes or openings occurring therein be reduced to any desired degree while the wires constituting the longitudinal and lateral strands of the cloth are being coated by the sprayed metal. Any desired number of coatings of metal may thus be sprayed onto the wire cloths, depending upon the fineness of openings or mesh desired in the finished or completely treated cloth. Besides reducing the size of opening in the wire cloth, the sprayed metal serves the function of tying or bonding together the wire strands at their regions of contact, thereby preventing relative movement of the strands and stiffening the cloth. The sprayed coating also increases the gauge or caliper of the wire strands, making them stiffer and more resistant to flexing. This bonding and stiffening effect in the case of the finely woven wire cloths, such as I employ, is of great advantage, for, whereas such wire cloths (e. g., those of about 200 or finer mesh) are quite flimsy and tend to tear and buckle readily as originally fabricated, they become relatively much stiffer, tougher, and tear-resistant and hence far more serviceable as a filtering medium. It is to be noted, however, that the sprayed coating is non-uniform and of a more or less porous character. Examination of the spray-coated wire cloth under the microscope indicates that the coating is irregular, there being multitudinous particles projecting from the wire strands and more or less obstructing or filling the openings or meshes that previously existed in the wire cloth and multitudinous fissures or pits in between such projecting particles. The fact is that it is only after the wire cloth has been sprayed a number of times with the molten metal that it acquires a continuous coating or covering of sprayed metal, for the fine particles of the spray attach themselves to the cloth in a more or less individualized condition and it is only after a given area has undergone repeated sprayings that such area becomes covered with a sufficient number of congealed fine particles to present a continuous coating.

Before subjecting wire cloth to the spraying treatment of the present invention, it is preferable to remove from such cloth grease and/or oxide film tending to impair the desired tenacity of bond between the sprayed particles and the wire strands. As is well known, wire is lubricated or greased to facilitate its drawing and weaving into wire cloth, and the wire undergoes more or less superficial oxidation during or after such fabricating operations. While it is possible to degrease and deoxidize the wire cloth by various treatments, the preferred treatment for the purpose of the present invention is to subject the wire cloth for an exceedingly short period of time to the action of aqua regia and to wash this treating agent promptly and completely from the cloth. In actual practice, the cloth may be dipped for only about one second or so in the aqua regia and immediately put under a forcible spray of a large volume of water. The aqua regia thus instantly attacks and dissolves such greasy matter and/or oxide as may be present on the wire surfaces and is washed away before it can do any damage. In order to avoid contamination of the cleansed cloth, it is preferable that the operator work with clean gloves while handling and/or spraying such cloth with molten metal. The cloth should, of course, preferably be dried preparatory to being sprayed with the molten metal; and drying is preferably effected rapidly as by a current of warm dry air.

In order to avoid wasting the molten metal as it is being sprayed as well as to get the wire cloth coated quickly to the desired degree, the molten metal is preferably sprayed onto the cloth while the latter is being backed up and supported on a suitable imperforate background. An efficient way of performing the spraying treatment is to wind a length of the wire cloth about a smooth-faced steel drum and to cause the drum to rotate as a spray of the molten metal is caused to play or shower onto the wire cloth. The spray gun from which the jet of atomized molten metal issues may be held in a carriage designed to traverse the drum in a transverse direction as the drum rotates, the carriage being caused to move transversely a predetermined distance with each revolution of the drum so as to ensure a substantially uniform spraying treatment of all the cloth surface. Thus, the carriage may be caused to move periodically in a transverse direction at a rate of, say, one-quarter inch per revolution of the drum. In some instances, the wire cloth may be progressively withdrawn from a supply or parent roll, fed around the steel drum while a plurality of jets or sprays of molten metal are impinging substantially uniformly on the cloth as it is being held against and supported by the drum, and led to a rewinder or cut into the desired lengths. The steel drum serves to flatten such fine molten metal particles as pass through the openings of the wire cloth, chilling them and keeping the wire cloth from being overheated and thus being burned or oxidized. It will be appreciated that myriad particles are shot out at high velocity against the wire cloth and the drum on which the cloth is supported; and such particles as pass through the openings of the wire cloth and strike against the drum so as to become flattened and chilled coalesce or fuse with adjacent particles and are anchored to the cloth. The spray-gun employed pursuant to my invention may be of the type wherein separate streams of oxygen and acetylene gas or separate streams of oxygen and hydrogen gas are led through concentric tubes and caused to unite at high velocity, a wire of the metal to be molten and sprayed being progressively fed to the locus of union or juncture of the two streams and being fused and disrupted or atomized under the intense heat and gas velocity engendered at such locus. The spray of molten metal thus produced is arranged at a distance with reference to the wire cloth being sprayed so as to maintain a molten condition in the particles as they impinge against the wire cloth without, however, unduly heating the wire cloth.

Various metals may be sprayed on the wire cloth to develop the desired fineness of mesh and other characteristics therein, the particular metal sprayed depending upon the chemical characteristics of the particular liquid to be filtered through the cloth. Thus any one of such metals as copper, nickel, aluminum, stainless steel, various other metal alloys, etc., may be sprayed when it is chemically resistant to the particular liquid to be filtered. It is usually preferable to spray metal of the same kind as that of which the wire cloth is composed, as in such instance, not only does the sprayed metal readily amalgamate with the wire cloth, but the wire cloth as well as the sprayed coating are resistant to the particular liquid being filtered. Also, when the metal being sprayed is the same as the wire cloth, no troubles arise on account of differences in melting points or coefficients of expansion. In some instances, however, the metal being sprayed may advantageously be of a variety different from that of which the wire cloth is composed as, for instance, when copper is sprayed against a cloth of nickel-copper alloy or when nickel is sprayed against a cloth composed of stainless steel. It might be mentioned that wire cloth spray-coated with copper may advantageously be used for such purposes as filtering out a precipitate from a liquor containing say, phosphoric acid; that wire cloth composed of, say, nickel, may be spray-coated with nickel and be used advantageously for such purposes as filtering precipitates from soluble-sulphide-containing or caustic-soda-containing solutions; that wire cloth composed of, say, silver or other noble metal may be spray-coated with silver or other noble metal and be used advantageously for such purposes as filtering liquid edibles. Various other illustrations involving a utilization of the principles of my invention might be given, but those mentioned will suffice.

It is possible to reduce the fineness of opening in wire cloth by spray-coating, as hereinbefore described, to a degree where the cloth will retain or hold back thereon any precipitate, no matter how fine. Thus, it is possible to produce spray-coated wire cloths that serve admirably for the purpose of filtering out such finely divided precipitates as the calcium carbonate precipitate produced by causticizing solutions of sodium carbonate with lime. In this connection, it is well to note that the commercially precipitated calcium carbonates or lime sludges, for instance, those produced by causticizing the so-called smelt solutions of soda and kraft pulp mills, are especially adapted as the filtering layer on the spray-coated wire cloth, for these precipitates are of a strongly cohesive nature, more or less akin to cement or plaster, by reason of the siliceous and other impurities present therein in small amount. They might further be characterized as being putty-like and they hence tend to remain in place, as contrasted with laboratory-precipitated or pure calcium carbonate which, on account of both its high degree of purity and its extremely fine particle size, does not yield a layer of the desired tenacity or cohesive strength. In forming a layer of the calcium carbonate sludges, such as I employ, it is thus possible to arrive at a layer of substantial continuity, smoothness, and freedom from cracks or other imperfections such as are apt to arise in a layer of pure calcium carbonate precipitate of extremely fine particle size and of fluffy and non-coherent or non-greasy character. In effect, therefore, the filtering layer of calcium carbonate produced as part and parcel of the filtering structure hereof is a uniform, porous, cohesive, plastic. The spray-coated wire cloth has important utility for such purposes as covering the rotors of continuous or rotary filters, for instance, filters of the "Oliver" type. To be sure, the openings in the spray-coated wire cloth tend to become plugged with the calcium carbonate precipitate after liquors containing such precipitate have been passed in large volume therethrough. However, no difficulty whatever is had in cleaning or restoring the efficiency of spray-coated wire filter cloths fouled with adherent or entrained calcium carbonate or similar precipitate which can be dissolved readily by chemical cleaning reagents. For instance, spray coated wire filter cloths fouled specifically with calcium carbonate are readily cleansed or restored to their original efficiency when washed with a weak solution of lactic acid, as such acid solution serves to convert the calcium carbonate into water-soluble calcium lactate. The spent cleaning reagent containing calcium lactate may be regenerated for reuse by a treatment with, say, sulphuric acid, in amount sufficient to liberate the lactic acid and to precipitate calcium sulphate which can be removed by filtration. The regeneration of the lactic acid is preferably performed with an amount of sulphuric acid slightly short of that theoretically necessary to react with the calcium lactate so as to avoid any free sulphuric acid in the resulting lactic acid solution, as sulphuric acid tends to corrode such wire cloths as are made of ordinary metals or metal alloys. Lactic acid has been mentioned for the purpose of cleaning the fouled wire filter cloth because it is a mild acid and has imperceptible effect on the metal of the wire cloth or on the filtering apparatus as a whole while at the same time producing soluble lactates. Such acids as acetic, hydrochloric and nitric might be used under closely regulated temperature, concentration, and other conditions, but inasmuch as they tend to react with ordinary metals or metal alloys even under the most carefully controlled conditions, it is preferable to work with such mild acids as lactic acid, as the latter require no supervision and accomplish the desired results.

There are numerous instances when it is desired to filter from liquid suspension finely divided precipitates which are insoluble in any known media. In such instances, while it is possible to prepare spray-coated wire cloth filtering media that do effectively the work of filtration, yet when such wire cloths become fouled with the insoluble solids, they cannot be cleansed or restored to their original effectiveness and must hence be discarded. I might cite as an illustration of precipitates of this latter variety, barium sulphate, strontium sulphate, and calcium sulphate precipitates produced in such chemically active liquors as strong caustic soda solutions. These precipitates, which may, for instance, be produced by causticizing solutions of barium hydroxide and strontium hydroxide with sodium sulphate, are exceedingly finely divided. When it is attempted to filter them out by passing the solutions in which they are suspended through spray-coated wire cloth of sufficiently fine mesh, it is necessarily the case that the fine meshes or openings in such wire cloth soon become clogged thereby and filtration reduced to a commercially unacceptable rate. As already indicated, the spray-coated wire cloth cannot be cleansed so that it would have to be discarded; and this would give rise to an inordinate expense.

In accordance with another phase of the present invention, filtration of exceedingly finely divided precipitates from liquid suspension is effected through a filter bed or layer of a distinctly coarser precipitate that is held or retained on spray-coated wire cloth those openings or meshes, although sufficiently fine to retain the coarser precipitate constituting the filtering bed, are nevertheless large enough to permit the free passage therethrough of the fine precipitate whose filtration is being sought. The coarser precipitate serving as the filter bed or layer is of a character that lends itself to dissolution in suitable chemical reagents, wherefore, when the openings or meshes in the spray-coated wire cloth become clogged with the course precipitate, they can readily be restored to a clean or open condition permitting the desired rate of filtration. The layer of course precipitate serving as the filter bed is built up to a thickness sufficient to retain thereon the finest sort of precipitates. For the purpose of holding the layer of course precipitate in place next to the spray-coated wire cloth and of permitting the filtered finely divided solids deposited on such layer to be removed, it is preferable that such layer be deposited and kept entrapped within a suitable wire fabric, such as twilled wire fabric, which affords intercommunicating openings or interstices therethroughout in which the course precipitate functioning as the filter layer may be entrapped as a substantially continuous but liquid-permeable stratum. Thus, in filtering out finely divided precipitate, such as barium sulphate, from suspension in a caustic soda solution, it is possible to employ the calcium carbonate sludge available in kraft or soda pulp mills from the causticization of the so-called smelt solutions in forming the filter layer, as such sludge is made up of comparatively coarse particles that naturally bind together and are retained on a spray-coated wire cloth whose meshes afford a commercially desirable rate of filtration but are too large to retain thereon the fine particles of precipitated barium sulphate suspended in the caustic soda solution. It might be remarked that the calcium carbonate sludge serving in such case as the filter layer is prepared as a layer of sufficient thickness and density to prevent the finely divided particles of precipitated barium sulphate from working therethrough, such particles being retained substantially in entirety on the surface of the filter layer as the caustic soda solution is seeping through the pores of the layer.

With the foregoing and other features and objects in view, the present invention will now be described in further detail with particular reference to the accompanying drawings, wherein, Figure 1 represents a transverse sectional view of a continuous or rotary filter embodying the principles of my invention.

Figure 1a is a section on the lines 1a—1a of Figure 1.

Figure 2 is a front view, partly in section, of the rotor of filtering cylinder alone.

Figure 3 is a greatly enlarged fragmentary section through the periphery of the rotor.

Figure 4 is a greatly magnified plan view of the original wire cloth to be sprayed.

Figure 5 is a similar view of the wire cloth after it has been spray-coated and its meshes greatly reduced.

Figure 6 is a similar view of the wire cloth after it has been spray-coated to an even greater extent and its meshes thus reduced to even finer size.

Figure 7 is a front view of a modified form of rotor or filtering cylinder, portions of the various strata constituting the periphery of the cylinder having been broken away to show their structural characteristics and their relative position.

Figure 7a shows in a way similar to Figure 7 another modified form of rotor or filtering cylinder.

The rotor shown in Figure 1 is designed to do the work of filtering continuously precipitates from liquid suspension, for instance, precipitated calcium carbonate suspended in a caustic soda solution or precipitated barium sulphate suspended in a caustic soda solution. The filter comprises a casing 10 of generally cylindrical shape, within which rotates a filtering cylinder 11. The casing 10 is preferably constructed in two parts, namely, a lower half 10a and an upper half 10b, which parts may be bolted together or otherwise secured to form a tight joint as at flange portions 10c. The upper half of the casing may be equipped with an eye-bolt 12 so that it may be hoisted out of the way when the casing is to be opened up for adjustment or repairs of the filtering cylinder. The upper half of the casing may also be equipped with a valved pipe 13 preferably located substantially centrally thereof, through which superheated steam or other compressed fluid may be delivered into the casing. In those instances when comparatively concentrated aqueous solutions are being filtered, the dissolved solids may tend to crystallize in the filter structure unless the solution is maintained at properly elevated temperature. In such case, superheated steam should be introduced through the pipe 13 into the filter casing so as to maintain the temperature of the solution sufficiently high to prevent such crystallization. In order to avoid fluctuating pressure conditions in the filter casing, it is desirable that the steam enter the pipe 13 from a reducing valve (not shown), thereby maintaining substantially constant pressure inside the filter casing. Aside from the important function of the superheated steam in preventing crystallization in and clogging of the pores of the filter structure, it serves additionally and importantly to enhance the rate of filtration and to maintain the filter layer or bed, presently to be described, in the desired firm or compact condition far short of saturation with liquor, so that such layer is constantly capable of imbibing liquor and permitting liquor to seep therethrough. When no problem of crystallizable solids in solution presents itself, compressed air or other fluid may be introduced through the pipe 13 to promote filtration.

The filtering cylinder 11 comprises a plurality of spiders 14 terminating in ring or peripheral elements 15 and arranged in spaced relationship between the end headers 16 and 17, respectively, of the cylinder. The end header 16 is equipped with a stub shaft 18 which is journalled for rotation in the casing wall. The end header 17 is equipped with a hollow shaft 19 communicating with the hollow or interior of the cylinder and also journalled for rotation in the casing wall. The pipe 19 serves to discharge the effluent or filtrate accumulating in the interior of the cylinder to a suitable destination (not shown). Sutiable bars or slats 20 may be welded or otherwise secured to the rings 15 of the spiders and to the headers 16 and 17 and thus serve as the supports for the filter structure constituting the periphery of the cylinder. The lowermost layer or backing of the filter structure is, as best shown in Figure 3, a layer 21 of twilled wire fabric. This layer is wound around the bars 20 with the warp strands 21a making the circle. The edges of the sheet of fabric necessary for covering the bars 20 may be welded or otherwise bonded in place, as by spraying molten metal at the overlapping margins and onto one of the bars 20 preferably located immediately in back of the seam. When the margins are welded together by spraying molten metal, excess molten metal may be deposited on the joint, whereupon the joint may be machined so as to present the desired smooth or true surface. One or more layers 22 of square woven wire cloth of fine mesh and spray-coated, as previously described, are then laid over the layer 21 so as to encompass it, the margins of these layers also being welded or otherwise secured in place, as by spray-coating in the manner described. The peripheral filtering structure of the cylinder is completed by a layer 23 of twilled wire fabric encompassing the layers 22, the layer 23 being secured in place in the same way as the layer 21. The layer 23 is designed to entrap and hold in place a substantially continuous layer 24 of coarse precipitate capable of retaining on its surface the finest of precipitates or the very same kind of precipitate. Specifically, the layers 22 may be spray-coated so that the meshes therein are made sufficiently small to prevent the passage therethrough of precipitates such as the calcium carbonate sludge produced in causticizing the so-called smelt solutions of a kraft or soda pulp mill. This sludge may be advantageously used in building up the filter bed or layer entrapped within the interstitial spaces of the twilled fabric 23. For the purpose of depositing the filter bed or layer in the twilled fabric 23, the practice may be to suspend the calcium carbonate sludge as a slurry in water and deliver it into the filter casing. The precipitate tends to accumulate rapidly in the pores and interstices of the twilled fabric layer 23, building up therein as a substantially continuous layer until a superfluity is on its surface and a doctor blade 25, presently to be described in greater detail, begins to remove the superfluity. The doctor blade is caused to work on the superfluity of calcium carbonate sludge being constantly deposited on the surface of the fabric 23 until there is no question but that a firm and substantially integral layer of calcium carbonate, substantially devoid of air-pockets or fissures, has been entrapped in the fabric. If desired, the squeezing of the calcium carbonate precipitate into the fabric 23 may be effected by a squeeze roll (not shown), which may be caused to bear down on the periphery of the cylinder and thus to force the superficial precipitate into the interstitial spaces of such fabric until the desired compact and substantially continuous layer has been developed therein. Once the desired layer of filtering solids have been entrapped in the fabric 23, the suspension of calcium carbonate sludge may be discharged from the filter casing.

Delivery of the liquors to be filtered may be effected through a valved pipe 26 communicating with a pipe 27 entering into the bottom of the filter casing. The pipe 27 may be valved below the pipe 26, as at 28; and the valve 28 may be opened when draining of the filter casing is to be effected. A liquor gauge 29 may be provided at one end of the casing to show the liquor level at any time in the casing.

As already indicated, the doctor blade 25 serves to remove solids filtering out on the surface of the fabric 23. In order to avoid injury to the fabric 23 as solids are being scraped or doctored therefrom, it is preferable, as shown in Figure 2, to wind a wire 30 of substantial caliper helically about the periphery of the filtering cylinder, thereby confining the scraping action of the doctor blade to the surface of such wire and making for a removal of only the solids depositing above the surface of the fabric 23. The doctor blade 25 is preferably fixed to a vertically adjustable plate 31 which may be bolted or otherwise secured to a wall of the hopper 32 into which the doctored precipitate is discharged. In order to avoid leakage of the liquor being filtered into the hopper 32, the adjustable fixation of the plate 31 is preferably made to accurately machined bars 33 fixed to the side walls 34 of the hopper, as best shown in Figure 1a. The fixation of the plate 31 may be effected by bolts 35, packing material preferably being laid in between the areas of contact of the plate 31 and the hopper wall 32a and the bars 33. By vertically adjusting the plate 31, it is possible to vary the liquor level in the casing without causing overflow of the liquor past the active edge of the doctor into the hopper 32 designed to receive only the filtered solids. It is preferable to provide an agitator or sludge-remover for the solids removed by the doctor 25, since there may be a tendency for sludge to accumulate or back up near the active edge of the doctor, particularly when the doctor is raised to a comparatively high position and must assume an almost horizontal position in effectively scraping solids from the filtering cylinder. The sludge-remover shown is essentially a rotary paddle wheel 36 whose blades or paddles 37 are arranged to remove solids in back of the active edge of the doctor blade as rapidly as they accumulate and to propel them into the hopper 32. The doctor blade 25 is adjustably secured to the plate 31, such adjustability permitting the blade to be moved to the desired angle relative to the periphery of the filtering cylinder. The paddle wheel is preferably simultaneously adjustable with the doctor blade 25, the doctor blade preferably assuming a curvature concentric with the axis of rotation of the paddle wheel and both being attached to common adjustable supports (not shown). By varying the height to which the effective edge of the doctor blade is raised, it is possible not only to vary the height of liquid level in the filter casing and thus to vary the active filtering area on the cylinder, but also to vary the peripheral area of the filtering cylinder that is above the liquor level and is exposed to the action of the steam or other compressed fluid introduced into the filter casing by way of the pipe 13.

The operator is preferably enabled to see what is going on in the filter casing and more particularly how the paddle wheel 37 is performing through a sight glass or window 38 installed in the upper half of the casing above the paddle wheel; and there may advantageously be other sight glasses 38 through the side walls of the casing and still another one 89 is an end wall. The hopper 32 includes a valved outlet 40 at its bottom so that when filtered solids have piled up sufficiently in the hopper, the operator may open the valve 40 to discharge such solids under the steam or gas pressure in the space above the liquor. Discharge of the filtered solids is effected into a second closed hopper 41 equipped with a valved outlet 42 which is kept closed during the discharge of filtered solids thereinto. Once the hopper 32 has been completely discharged, the operator closes the valve 40 of this hopper and opens the valve 42 of the hopper 41 so that the filtered solids may be discharged from the latter. Discharge of the filtered solids from the hopper 41 is preferably promoted by emitting live steam or compressed air thereinto through a valved pipe 43 communicating with the upper end of this hopper.

I wish again to remark upon the kind of solids that may be filtered from liquid suspension by the continuous or rotary filter hereinbefore described. As already stated, precipitated calcium carbonate suspended in caustic soda solution may be separated from such solution and recovered as a sludge by the use of such filter. Again, more finely divided precipitates, such as precipitated barium sulphate or strontium sulphate suspended in caustic soda solution may be separated as a sludge from such solution by the use of such filter, for, as already observed, the precipitated calcium carbonate sludge embedded in the fabric 23 as the filter bed or layer of the filter structure is capable of retaining the finest precipitates on its surface. When the sprayed wire cloths 22 of the filter structure become fouled with calcium carbonate sludge, which tends to be driven or forced into the cloths during the use of the filter, they may readily be cleaned by running lactic acid through the filter structure, as has already been described in detail; and, when the filter bed or layer of calcium carbonate has become fouled with barium sulphate, the filter structure as a whole may be cleaned with the lactic acid cleansing reagent, for, as has already been described, the meshes or openings in the wire cloths 22 are sufficiently large to permit the fine particles of barium sulphate to pass freely therethrough.

To illustrate the effect of spray-coating square-woven wire cloth so as to reduce its meshes or openings decidedly, in accordance with my invention, attention is invited to Figures 4, 5 and 6 of the drawings. Thus, starting with the original or uncoated square-woven wire cloth shown in Figure 4, which may be of about two hundred to three hundred mesh, a number of spray-coats of suitable metal may be applied to such cloth to reduce its meshes or openings to openings or meshes of much finer average size, as occur in the spray-coated cloth shown in Figure 5. By spraying a still greater number of coatings of suitable metal onto the wire cloth, the meshes or openings therein may be progressively reduced to even finer size, for instance, the size possessed by the spray-coated wire cloth illustrated in Figure 6. In other words, it is plain that the size of meshes or openings in the wire cloth may be made to vary all the way from that occurring in the original wire cloth to an imperforate plate, depending upon the number of spray-coats deposited on the wire cloth. In order to avoid erroneous deduction to the effect that the spray-coatings shown in Figures 5 and 6 are impermeable, I wish to point out that when such coatings are thinly deposited so as to produce an apparently continuous structure, they are none the less permeable to liquids. It is only when the coatings are sprayed to substantial thicknesses that they acquire the quality of substantial impermeability.

In those instances when filtration is best effected under considerable steam or other fluid pressure, it is desirable to construct the periphery of the filtering cylinder in such a way that it will stand the stresses of such pressure without localized bending or flexing movement of the various layers constituting the filter structure. A filtering cylinder so constructed is shown in Figure 7, which cylinder differs from that shown in Figure 2 in that a perforated metal plate 44 of substantial thickness and rigidity is wound about the spiders 14 before the first layer 21 of twilled wire cloth is anchored in place. It might be observed that the imperforate areas in the plate 44 do not interfere in the slightest with filtration, for once the liquid being filtered has found its way through the filter structure into the twilled fabric backing layer 21, it issues freely in all directions through the comparatively large intercommunicating interstitial spaces in the twilled fabric 21 and passes freely through the perforations of the plate 44 into the interior of the cylinder.

The modified filtering cylinder shown in Figure 7a varies in other respects from that shown in Figure 2. Thus, a shaft 45 may be fixed not only to an end-header 46 of the cylinder but pass through and be keyed to the various spiders 47 and terminate in a one piece casting 48 designed to receive the filtrate from the hollow of the cylinder proper. The plate 44 may be received in a peripheral inner corner groove or recess 49 machined in the casting 48 and be suitably secured thereto, as by riveting. The casting 48 is shown as including an inner partition or wall 50 having openings 51 therethrough in spaced relationship concentrically at its marginal zone so that effluent or filtrate will readily flow from the interior of the cylinder proper into the hollow 52 of the casting. The casting 48 is shown as including also an outer partition or wall 53 having a large central opening 53a through which an elbowed discharge pipe 54 may be inserted, the elbowed portion 54a having an open lower end that dips into the effluent or filtrate accumulating at the bottom of the casting 48. The opening in the outer wall 53 is shown closed off by a casting 55 secured thereto, as by bolts 56, and carrying a stuffing box 57 which prevents leakage of filtrate past the exterior wall of the pipe 54 and also prevents sludge or filtered solids from working inside the filtering cylinder. The pipe 54 may rest on a support adjacent to the stuffing box 57 and be additionally supported by an end wall of the casing, passing through a stuffing box immediately outside the end wall of the casing. It is thus seen that the pipe 54 further serves as a shaft or support about which the filtering cylinder rotates. If desired, the filtering cylinder may also be rotatably supported on trunnions 60 located on the inside of the filter casing, as shown in Figure 1.

It should be appreciated that the specific embodiments of my invention hereinbefore described are illustrative only and that the principles of filtration and the apparatus for filtration hereinbefore described are subject to considerable change and modification without departing from the spirit or scope of my invention as defined in the appended claims. For instance, whereas I have described my invention in terms of filtering finely divided solids from aqueous suspension, it should, of course, be understood that solids may be filtered pursuant to my invention from various organic liquids, such as oils, alcohols, glycerine, etc. So, too, while I have described the spraying of molten metal on finely woven wire cloth for the purpose of reducing the size of meshes or openings therein, as this constitutes a preferred and eminently practicable embodiment of my invention, nevertheless it will be appreciated that other solid materials that lend themselves to spraying and that function more or less similarly to molten metal may be used when occasions so demand. Thus, there may be instances when glass or similar vitreous materials may be applied to advantage to woven wire cloth or to other porous structures for the purpose of reducing the size of the pores or openings therein. In other words, the interstitial or porous layer through which filtration is being effected need not necessarily be a woven wire cloth but may be another type of porous structure whose pores or openings are too large for the particular work of filtration at hand. I may sight as an example the matted, inorganic fibrous structure known a "Filtross" which is sometimes used as a filter bed or filtering medium. Such filtering medium does not function successfully in filtering out finely divided precipitates, since the pores or openings therein are too large, but, by spraying the surface of such material with molten metal, glass, or the like, in accordance with my invention, it is possible to diminish the size of its pores or openings to a point where, although they permit ready passage therethrough of liquid media, nevertheless exclude finely divided precipitates or other finely divided solids.

I claim:

1. A filter structure adapted to remove extremely finely divided precipitate from aqueous suspension comprising a medium whose pores and openings are of such fine size as to retain thereon precipitated calcium carbonate of the character of lime sludge while permitting free flow of aqueous medium therethrough and a layer of precipitated calcium carbonate of the character of lime sludge deposited on said medium and capable of retaining thereon and therein precipitates of a particle size finer than itself.

2. A filter structure adapted to remove extremely fine precipitate from aqueous suspension comprising a medium whose pores and openings are of a size permitting passage therethrough of a fine precipitate but preventing passage therethrough of precipitated calcium carbonate of the character of lime sludge, a layer of said precipitated calcium carbonate of the character of lime sludge deposited on said medium, and another medium in which said layer of precipitated calcium carbonate is entrapped, said layer of precipitated calcium carbonate being capable of retaining said extremely fine precipitate thereon and therein.

3. A filter structure adapted to remove extremely fine precipitate from aqueous suspension comprising wire cloth spray-coated with metal and containing meshes of a size permitting passage therethrough of a fine precipitate but preventing passage therethrough of precipitated calcium carbonate of the character of lime sludge, a layer of said precipitated calcium carbonate of the character of lime sludge deposited on said wire cloth, and another wire cloth of twilled woven structure wherein said layer of precipitated calcium carbonate is entrapped, said layer of precipitated calcium carbonate being capable of retaining said fine precipitate thereon and therein.

4. A method of preparing wire cloth, whose mesh is finer than about 200 but is too coarse for filtering out from fluid suspension finely divided solids of the particle size characteristics of precipitated calcium carbonate, for filtering out said solids, which comprises spraying said cloth with molten material until its meshes have been reduced sufficiently to prevent said solids from passing therethrough while permitting the suspension fluid to pass readily therethrough.

5. A method of preparing wire cloth of about 200 to 300-mesh for filtering out from fluid suspension finely divided solids of the particle size characteristics of precipitated calcium carbonate, which comprises spraying said cloth with molten metal until its meshes have been reduced sufficiently to prevent said solids from passing therethrough while permitting the suspension fluid to pass readily therethrough.

6. A filter medium comprising wire cloth spray-coated with material serving to bond together its wire strands at their regions of contact and to stiffen it markedly, said cloth being originally flexible and of a mesh, although finer than about 200, too coarse to retain precipitated calcium carbonate but said sprayed coating material reducing its meshes sufficiently to enable the retention thereon of precipitated calcium carbonate.

7. A filter medium comprising wire cloth spray-coated with metal serving to bond together its wire strands at their regions of contact and to stiffen it markedly, said cloth being originally of about 200 to 300-mesh but said sprayed coating metal reducing its meshes at least sufficiently to prevent passage therethrough of precipitated calcium carbonate.

8. A filter structure adapted to remove from aqueous suspension an extremely fine precipitate of finer particle size than that of precipitated calcium carbonate, comprising wire cloth spray-coated with metal, said cloth being originally of a mesh, although finer than about 200, too coarse to retain precipitated calcium carbonate but said sprayed coating metal reducing its meshes sufficiently to enable the retention thereon of precipitated calcium carbonate, and a layer of precipitate of the particle size characteristics of precipitated calcium carbonate deposited on said cloth and capable of retaining said extremely fine precipitate thereon and therein.

9. A filter structure adapted to remove from aqueous suspension an extremely fine precipitate of finer particle size than that of precipitated calcium carbonate, comprising wire cloth spray-coated with metal, said cloth being originally of about 200 to 300-mesh but said sprayed coating metal reducing its meshes sufficiently to enable the retention thereon of precipitated calcium carbonate, a layer of precipitate of the particle size characteristics of precipitated calcium carbonate deposited on said medium, and another medium in which said layer of precipitate is entrapped, said layer of precipitate being capable of retaining said extremely fine precipitate thereon and therein.

10. A method of preparing wire cloth, whose mesh is finer than about 200 but is too coarse for filtering out from fluid suspension finely divided solids of the particle size characteristics of precipitated calcium carbonate, for filtering out said solids, which comprises treating said cloth for only a very short period of time with aqua regia, washing the cloth, drying it, and spraying it with molten metal until its meshes have been reduced sufficiently to prevent said solids from passing therethrough while permitting the suspension fluid to pass readily therethrough.

11. A method of preparing wire cloth, whose mesh is finer than about 200 but is too coarse for filtering out from fluid suspension finely divided solids of the particle size characteristics of precipitated calcium carbonate, for filtering out said solids, which comprises spraying said cloth, while it is backed up by and supported on an imperforate background, with molten metal until its meshes have been reduced sufficiently to prevent said solids from passing therethrough while permitting the suspension fluid to pass readily therethrough.

12. A method of preparing wire cloth of about 200 to 300-mesh for filtering out from fluid suspension finely divided solids of the particle size characteristics of precipitated calcium carbonate, which comprises treating said cloth for only a very short period of time with aqua regia, washing the cloth, drying it, and spraying it, while it is backed up by and supported on an imperforate background, with molten metal until its meshes have been reduced sufficiently to prevent said solids from passing therethrough while permitting the suspension fluid to pass readily therethrough.

HUGH KELSEA MOORE.